US012185052B2

(12) United States Patent
Bai et al.

(10) Patent No.: US 12,185,052 B2
(45) Date of Patent: Dec. 31, 2024

(54) EARPHONE CONTROL METHOD, EARPHONE BOX, EARPHONE AND STORAGE MEDIUM

(71) Applicant: GOERTEK INC., Weifang (CN)

(72) Inventors: Bin Bai, Weifang (CN); Minghui Hu, Weifang (CN); Xuemei Wang, Weifang (CN); Yanhong Yao, Weifang (CN); Guangming Yin, Weifang (CN); Xiaokang Li, Weifang (CN); Tao Li, Weifang (CN); Haojie Luan, Weifang (CN); Zengguo Xu, Weifang (CN)

(73) Assignee: GOERTEK INC., Weifang (CN)

( * ) Notice: Subject to any disclaimer, the term of this patent is extended or adjusted under 35 U.S.C. 154(b) by 271 days.

(21) Appl. No.: 17/849,659

(22) Filed: Jun. 26, 2022

(65) Prior Publication Data

US 2022/0329928 A1 Oct. 13, 2022

Related U.S. Application Data

(63) Continuation of application No. PCT/CN2020/134843, filed on Dec. 9, 2020.

(30) Foreign Application Priority Data

Dec. 30, 2019 (CN) ......................... 201911423385.1

(51) Int. Cl.
*H04R 1/10* (2006.01)

(52) U.S. Cl.
CPC ....... *H04R 1/1041* (2013.01); *H04R 2201/10* (2013.01)

(58) Field of Classification Search
CPC ...... H04R 1/10; H04R 1/1025; H04R 1/1041; H04R 1/1016; H04R 2201/10

(Continued)

(56) References Cited

U.S. PATENT DOCUMENTS

2017/0201945 A1* 7/2017 Chae ................. H04W 52/0258

FOREIGN PATENT DOCUMENTS

CN 108769856 A 11/2018
CN 109640207 A 4/2019

(Continued)

OTHER PUBLICATIONS

First Office Action issued in corresponding Chinese Application No. 201911423385.1; mailed Nov. 4, 2020; 17 pgs.

(Continued)

*Primary Examiner* — Paul Kim

(74) *Attorney, Agent, or Firm* — HAUPTMAN HAM, LLP

(57) ABSTRACT

An earphone control method is applied to an earphone box provided with a first electrical contact, when the first electrical contact is in a charging state, the first electrical contact is configured for charging the earphone, and when the first electrical contact is a communication state, the first electrical contact is configured for establishing communication between the earphone box and the earphone, the method includes: in responding to that the first electrical contact is in the charging state, and the earphone box detects that a communication requirement exists between the earphone box and the earphone, adjusting a voltage level of the first electrical contact to send preset signals to the earphone; and upon receiving a response signal fed back by the earphone based on the preset signals, switching the first electrical contact to the communication state. An earphone box, an earphone and a computer-readable storage medium are also disclosed.

8 Claims, 4 Drawing Sheets

(58) Field of Classification Search
USPC ............................................................ 381/74
See application file for complete search history.

(56) References Cited

FOREIGN PATENT DOCUMENTS

| | | | |
|---|---|---|---|
| CN | 209072692 | U | 7/2019 |
| CN | 209234010 | U | 8/2019 |
| CN | 110611348 | A | 12/2019 |
| CN | 111031443 | A | 4/2020 |
| EP | 3174214 | A1 | 5/2017 |

OTHER PUBLICATIONS

Second Office Action issued in corresponding Chinese Application No. 201911423385.1; mailed May 25, 2021; 18 pgs.
Notification of Grant issued in corresponding Chinese Application No. 201911423385.1; mailed Aug. 31, 2021; 5 pgs.
International Search Report and Written Opinion issued in corresponding International Application No. PCT/CN2020/134843; mailed Mar. 8, 2021; 16 pgs.

* cited by examiner

EARPHONE CONTROL METHOD, EARPHONE BOX, EARPHONE AND STORAGE MEDIUM

CROSS REFERENCE TO RELATED APPLICATIONS

The present application is a continuation of International Application No. PCT/CN2020/134843, filed on Dec. 9, 2020, which claims priority to Chinese patent application No. 201911423385.1, entitled "Earphone Control Method, Earphone Box, Earphone and Storage Medium" filed on Dec. 30, 2019, the entire contents of the aforementioned application are incorporated herein for reference.

TECHNICAL FIELD

The present application relates to the technical field of intelligent wearable equipment, in particular to an earphone control method, an earphone box, an earphone and a computer-readable storage medium.

BACKGROUND

In order to realize charging of the earphone charging box to the true wireless stereo (TWS) earphone and communication of the earphone charging box with the TWS earphone, three lines are often used for charging of the charging box to the earphone and communication of the charging box with the earphone, and the three lines are the ground line, the power line and the communication line. However, based on such an arrangement of the charging box, there are lots of contact points between the TWS earphone and the earphone charging box, thus the stability of the TWS earphone is affected.

The above-mentioned content is only used to assist in understanding the technical solution of the present application, and does not mean that the above-mentioned content is recognized as the prior art.

SUMMARY

The main purpose of the present application is to provide an earphone control method, an earphone box, an earphone and a computer readable storage medium, which improves the stability of the TWS true wireless stereo earphone.

In order to achieve the above purpose, the present application provides an earphone control method applied to an earphone box, the earphone box is provided with a first electrical contact, when the first electrical contact is in a charging state, the first electrical contact is configured for charging the earphone, and when the first electrical contact is a communication state, the first electrical contact is configured for establishing communication between the earphone box and the earphone, the earphone control method includes:

in responding to that the first electrical contact is in the charging state, and the earphone box detects that a communication requirement exists between the earphone box and the earphone, adjusting a voltage level of the first electrical contact to send preset signals to the earphone through the first electrical contact; and upon receiving a response signal fed back by the earphone based on the preset signals, switching the first electrical contact to the communication state.

Optionally, the earphone control method further includes:

controlling the voltage level of the first electrical contact to alternately switch between a low level and a high level for a first preset number of times.

Optionally, after the operation of upon receiving the response signal fed back by the earphone based on the preset signals, switching the first electrical contact to the communication state, the method further includes:

detecting that the earphone box meets a first preset condition, and switching the first electrical contact to the charging state;

the first preset condition includes at least one of the followings:

the earphone box having no data to be sent to the earphone;

no data being received from the earphone in a preset duration;

a number of times of receiving an empty data packet from the earphone being greater than or equal to a second preset number of times; and detecting that the earphone is not fully charged.

In order to achieve the above purpose, the present application further provides an earphone box, The earphone box includes a memory, a processor, and an earphone control program stored in the memory and executable by the processor, when the earphone control program is executed by the processor, the operations of the above earphone control method are implemented.

In order to achieve the above purpose, the present application further provides a earphone control method applied to the earphone, the earphone is provided with a second electrical contact, when the second electrical contact is in a charging state, the second electrical contact is configured for charging the earphone after being electrically connected with a first electrical contact of the earphone box; and when the second electrical contact is in a communication state, the second electrical contact is configured for establishing communication between the earphone and the earphone box after being electrically connected with the first electrical contact of the earphone box, the earphone control method includes:

in responding to that the second electrical contact is in the charging state, and the earphone detects that a voltage level of the first electrical contact changes, performing detection of preset signals; and switching the second electrical contact to the communication state, and sending a response signal corresponding to the preset signals to the earphone box to establish communication between the earphone and the earphone box.

Optionally, after the operation of in responding to that the second electrical contact is in the charging state, and the earphone detects that the voltage level of the first electrical contact changes, performing detection of preset signals, the method further includes:

determining whether the preset signals meet a second preset condition, where the second preset condition includes a number of times of detection of the preset signals being greater than or equal to a first preset number of times; and in responding to that the preset signals meet the second preset condition, switching the second electrical contact to the communication state, and sending the response signal corresponding to the preset signals to the earphone box to establish communication between the earphone and the earphone box.

Optionally, the earphone control method further includes:

in responding to that a preset signal is detected, incrementing the number of times of detection of the preset signals by one, and detecting a next preset signal after a first duration;

in responding to that the next preset signal is detected in a second duration after the first duration, incrementing the number of times of detection of the preset signals by one, and after the second duration, returning to execute the operation of in responding to that the preset signal is detected, incrementing the number of times of detection of the preset signals by one, and detecting the next preset signal after the first duration; and in responding to that the next preset signal is not detected in the second duration after the first duration, and the number of times of detection of the preset signals is less than the first preset number of times, resetting the number of times of detection of the preset signals to zero.

Optionally, after the operation of switching the second electrical contact to the communication state, and sending the response signal corresponding to the preset signals to the earphone box to establish communication between the earphone and the earphone box, the method further includes:

in responding to that the earphone meets a third preset condition, switching the second electrical contact to the charging state, the third preset condition includes at least one of the following:

the earphone having no data to be sent to the earphone box;

no data being received from the earphone box in a preset duration; and a number of times of receiving an empty data packet from the earphone box being greater than or equal to a second preset number of times.

In order to achieve the above purpose, the present application further provides an earphone, the earphone including a memory, a processor, and an earphone control program stored in the memory and executable by the processor, when the earphone control program is executed by the processor, the operations of the above earphone control method are implemented.

In order to achieve the purpose, the present application further provides a computer readable storage medium, an earphone control program is stored in the computer readable storage medium, when the earphone control program is executed by a processor, the operations of the above earphone control method are implemented.

According to the earphone control method, the earphone box, the earphone and the computer readable storage medium provided by the present application, when the first electrical contact is in the charging state, and the earphone box detects that there is a communication requirement between the earphone box and the earphone, the voltage level of the first electrical contact is adjusted to send preset signals to the earphone through the first electrical contact. When a response signal fed back by the earphone based on the preset signals is received, the first electrical contact is switched to the communication state. In this way, charging of the earphone box to the earphone and communication between the earphone box and the earphone can be realized based on the electrical contact, no additional communication line is needed, the contacts between the TWS earphone and the earphone charging box is reduced, and the stability of the TWS earphone is improved.

The realization of the objectives, functional features and advantages of the present application will be further explained with reference to the accompanying drawings in combination with the embodiments.

DETAILED DESCRIPTION OF THE EMBODIMENTS

It should be understood that the specific embodiments described herein are only used to explain the present application, and are not intended to limit the present application.

The present application provides an earphone control method, charging of an earphone box to an earphone and communication of the earphone box with the earphone can be realized based on an electrical contact, no additional communication line is needed, the number of the contact points between the TWS earphone and the earphone charging box is reduced, and the stability of the TWS earphone is improved.

Figure 1:
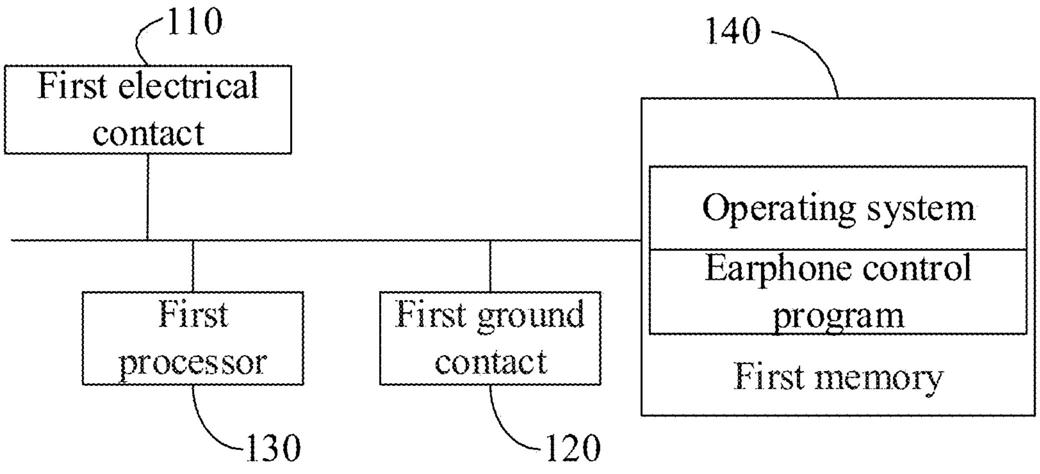
FIG. 1 is a schematic diagram of a hardware running environment of an earphone box involved in an earphone control method according to the present application.
Figure 2:
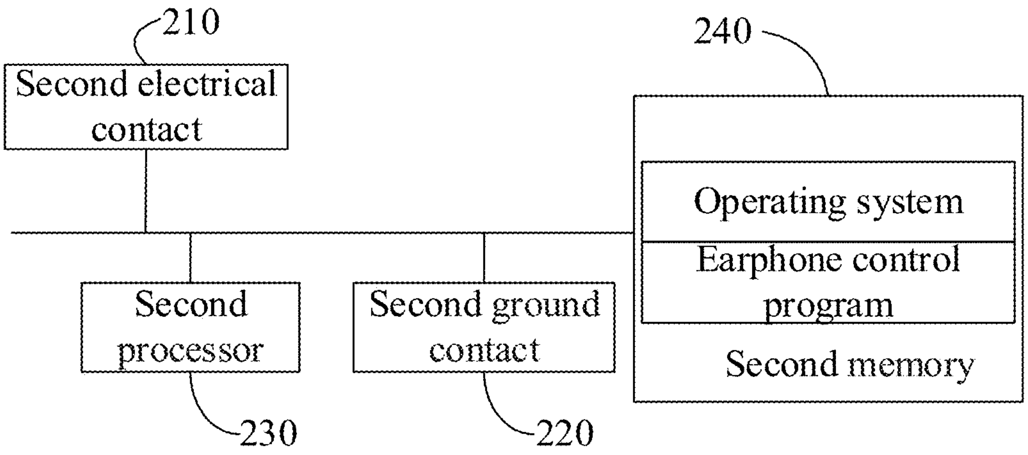
FIG. 2 is a schematic diagram of a hardware running environment of an earphone involved in the earphone control method according to the present application.
Figure 3:
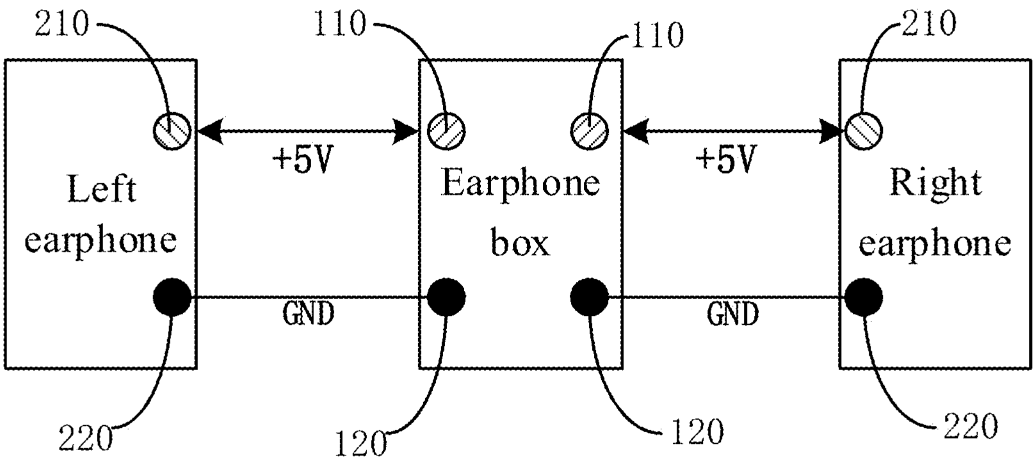
FIG. 3 is a schematic diagram of charging the earphone by the earphone box.
Figure 4:
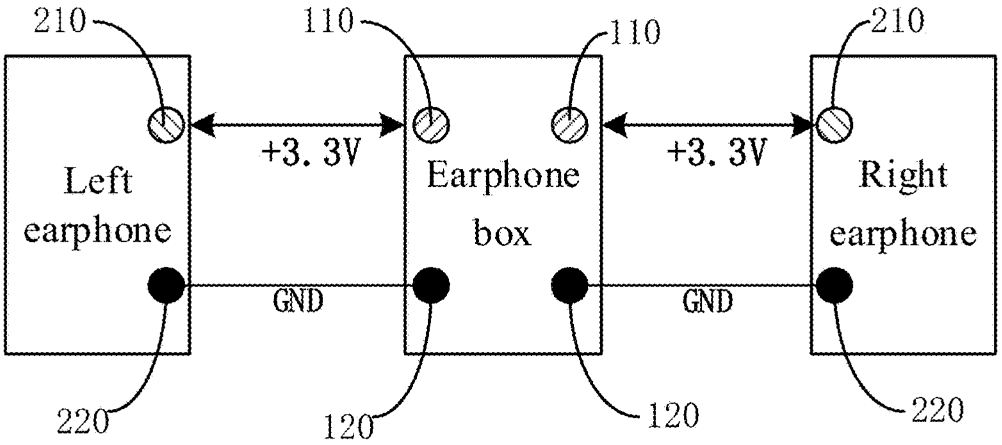
FIG. 4 is a schematic diagram of communication between the earphone box and the earphone.

Referring to FIG. 1 to FIG. 4, FIG. 1 is a schematic diagram of a hardware architecture of an earphone box involved in the earphone control method according to the present application. FIG. 2 is a schematic diagram of a hardware architecture of an earphone involved in the earphone control method of the present application. FIG. 3 is a schematic diagram showing connections between contacts of the earphone box and contacts of the earphone under a charging state. FIG. 4 is a schematic diagram showing connections between the contacts of the earphone box and the contacts of the earphone under a communication state.

As shown in FIG. 1, the earphone box may include a first electrical contact 110, a first ground contact 120, and a first processor 130 and a first memory 140. An earphone control program and an operating system may be stored in the first memory 140. A second communication identifier of the earphone, a first communication identifier of the earphone box and a region code may also be stored in the first memory 140. The first electrical contact 110 may be connected to a power supply device of the earphone box. The power supply device may be a battery or a power supply interface which receives power from an external device. Further, the first electrical contact 110 is further connected to a communication interface of the earphone box, when the first electrical contact 110 is in the charging state, the first electrical contact 110 is configured for charging the earphone in the earphone box; and when the first electrical contact 110 is in the communication state, the first electrical contact 110 is configured for establishing a communication between the earphone box and the earphone.

Optionally, that is, the first electrical contact 110 is simultaneously connected to a power line and a communication line of the earphone box, and the first ground contact 120 is connected to a ground line of the earphone box.

It should be understood that since a TWS earphone generally has left and right discrete earphones; the earphone box can be provided with two first electrical contacts and two first ground contacts.

As shown in FIG. 2, the earphone may include a second electrical contact 210, a second ground contact 220, a second processor 230 and a second memory 240. The second memory 240 may store an earphone control program and an operating system, and may further save the second communication identifier of the earphone, the first communication identifier of the earphone box, and a communication frequency. In this embodiment, the earphone may further include a loudspeaker and a microphone.

It should be understood that since a TWS earphone generally has left and right discrete earphones, each of left and right earphones of the TWS earphone have a second electrical contact and a second ground contact.

Referring to FIG. 3, when the earphone is placed in the earphone box, the first electrical contact 110 is electrically connected with the second electrical contact 210, and the first ground contact 120 is electrically connected with the second ground contact 220. Since the first electrical contact 110 are connected to a power supply, when the first electrical contact 110 and the second electrical contact 210 are electrically connected with each other, the second electrical contact 210 can detect a voltage input. Optionally, when the first electrical contact 110 is in the charging state, the power supply provides a voltage of ±5 V to the first electrical contact, so as to charge the earphone that is electrically connected with the first electrical contact 110 and the first ground contact 120.

Referring to FIG. 4, when the earphone is placed in the earphone box, the first electrical contact 110 is electrically connected with the second electrical contact 210, and the first ground contact 120 is electrically connected with the second ground contact 220. Since the first electrical contact 110 is connected to the power supply, when the first electrical contact 110 is electrically connected with the second electrical contact 210, the second electrical contact 210 can detect the voltage input. Optionally, when the first electrical contact 110 is in the communication state, the power supply provides a voltage of 1-3.3 V to the first electrical contact as a communication voltage, at this time, the earphone box may use the communication interface connected to the first electrical contact 110 and communicate with the earphone electrically connected with the earphone box, based on the first electrical contact 110.

It should be noted that the electrical contacts in the present application may be in the form of an electrical interface, and the ground contacts may be in the form of a grounding interface.

Corresponding to FIG. 1 and FIG. 2, when the earphone control program in the first memory 140 is executed by the processor, the following operations are implemented:

in responding to that the first electrical contact is in the charging state, and the earphone box detects that a communication requirement exists between the earphone box and the earphone, adjusting a voltage level of the first electrical contact to send preset signals to the earphone through the first electrical contact;

upon receiving a response signal fed back by the earphone based on the preset signals, switching the first electrical contact to the communication state.

Further, the operation of adjusting the voltage level of the first electrical contact includes:

controlling the voltage level of the first electrical contact to alternately switch between a low level and a high level for a first preset number of times.

Further, after the operation of upon receiving the response signal fed back by the earphone based on the preset signals, switching the first electrical contact to the communication state, the following operations are implemented:

detecting that the earphone box meets a first preset condition, switching the first electrical contact to the charging state;

the first preset condition includes at least one of the following:

the earphone box having no data to be sent to the earphone;

no data being received from the earphone in a preset duration;

a number of times of receiving an empty data packet from the earphone being greater than or equal to a second preset number of times;

detecting that the earphone is not fully charged.

When the earphone control program in the second memory 240 is executed by the processor, the following operations are implemented:

in responding to that the second electrical contact is in the charging state; and the earphone detects that the voltage level of the first electrical contact changes, performing detection of the preset signals;

switching the second electrical contact to the communication state, and sending a response signal corresponding to the preset signals to the earphone box to establish communication between the earphone and the earphone box.

Further, after the operation of in responding to that the second electrical contact is in the charging state, and the earphone detects that the voltage level of the first electrical contact changes, performing detection of the preset signals, the following operations are further implemented:

determining whether the preset signals meet a second preset condition, where the second preset condition includes a number of times of detection of the preset signals being greater than or equal to a first preset number of times;

in responding to that the preset signals meet the second preset condition, switching the second electrical contact to the communication state, and sending the response signal corresponding to the preset signals to the earphone box to establish the communication between the earphone and the earphone box.

Further, the following operations are further implemented:

- in responding to that a preset signal is detected, incrementing the number of times of detection of the preset signals by one, and detecting a next preset signal after a first duration;
- in responding to that the next preset signal is detected in a second duration after the first duration, incrementing the number of times of detection of the preset signals by one, and after the second duration, returning to execute the operation of in responding to that the preset signal is detected, incrementing the number of times of detection of the preset signals by one, and detecting the next preset signal after the first duration;
- in responding to that the next preset signal is not detected in the second duration after the first duration, and the number of times of detection of the preset signals is less than the first preset number of times, resetting the number of times of detection of the preset signals to zero.

Further, after the operation of switching the second electrical contact to the communication state, and sending the response signal corresponding to the preset signals to the earphone box to establish the communication between the earphone and the earphone box, the following operations are further implemented:

- in responding to that the earphone meets a third preset condition, switching the second electrical contact to the charging state;
- the third preset condition includes at least one of the following:
- the earphone having no data to be sent to the earphone box;
- no data being received from the earphone box in a preset duration;
- a number of times of receiving an empty data packet from the earphone box being greater than or equal to a second preset number of times.

Figure 5:
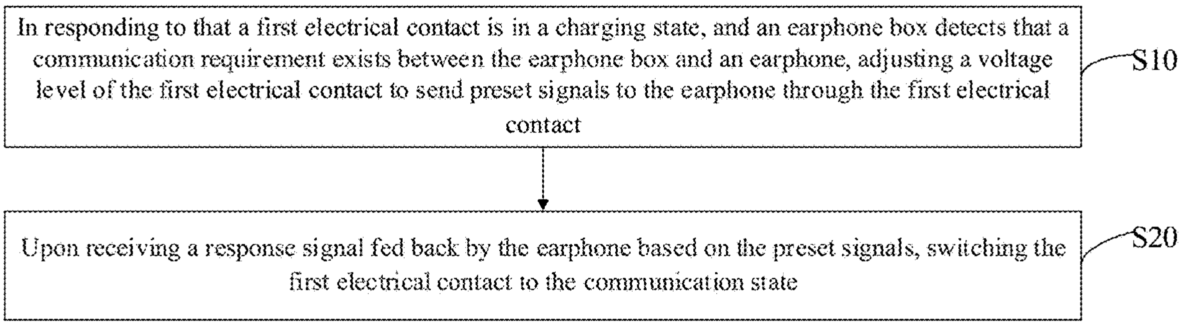
FIG. 5 is a schematic flowchart of an earphone control method according to a first embodiment of the present application.

Referring to FIG. 5, in an embodiment, the earphone control method includes:

- operation S10, in responding to that a first electrical contact is in a charging state, and an earphone box detects that a communication requirement exists between the earphone box and an earphone, adjusting a voltage level of the first electrical contact to send preset signals to the earphone through the first electrical contact.

In this embodiment, the executive terminal is the earphone box.

The TWS earphone is also called TWS Bluetooth® earphone, the TWS earphone does not need wired connection, and the left and right earphone modules form a stereo system through Bluetooth® technology, a song enjoying effect, a talking effect and a wearing effect are improved. Due to the fact that the TWS earphone has a small battery capacity and a short standby time, the TWS earphone is generally used in cooperation with a charging box. When the TWS earphone is not in use, the TWS earphone can be placed in the charging box for charging. The charging box can display the power level of the TWS earphone, such as full power, normal power and low power. The charging box can communicate with the earphone to realize the forced pairing with the TWS earphone, opening or closing the box, over-the-air (OTA) upgrading and the like.

Optionally, the earphone box can adjust the voltage level of the first electrical contact to control the first electrical contact to switch between the charging state and a communication state.

Optionally, when the voltage level of the first electrical contact is adjusted to be +5V, the first electrical contact is in the charging state; and when the voltage level of the first electrical contact is adjusted to be +3.3V, the first electrical contact is in the communication state.

Optionally, the earphone box can detect whether a communication requirement exists between the earphone box and the earphone in real time or regularly. Optionally, when the earphone box detects that there are data needed to be sent to the earphone, the earphone box determines that there is a communication requirement, otherwise, the earphone box determines that there is no communication requirement.

Optionally, upon detecting that there is no communication requirement between the earphone box and the earphone, the earphone box switches the first electrical contact to the charging state; and upon detecting that a communication requirement exists between the earphone box and the earphone, the earphone box switches the first electrical contact to the communication state.

Optionally, when the first electrical contact is in the charging state, the first electrical contact can be used for charging the earphone which is placed in the earphone box and electrically connected with the earphone box. At this time, upon detecting that a communication requirement exists at current, the earphone box can firstly send the preset signals to the earphone through the first electrical contact, to notify the earphone that the earphone box needs to establish a communication with the earphone at current and needs to suspend the charging.

It should be noted that for the earphone in communication with the earphone box, it's second electrical contact needs to electrically connect with the first electrical contact of the earphone box, and it's second ground contact needs to electrically connect with the first ground contact of the earphone box.

Optionally, the earphone box can alternately switch the voltage level of the first electrical contact between the low level (e.g., 0V) and the high level (e.g., 5V) for the first preset number of times, so as to send the preset signals to the earphone. Each time a switching operation of switching between the high level and the low level is performed, it is equivalent to generating one preset signal.

Further, in the process of switching the voltage level of the first electrical contact between the low level and the high level, the earphone box controls the time interval between two adjacent switching operations to be a preset interval.

It should be noted that the preset number of times and the preset interval may be set by an engineer in advance according to the actual condition, for example, the first preset number of times may optionally be 5, and the preset interval may optionally be 4 ms.

Figure 10:
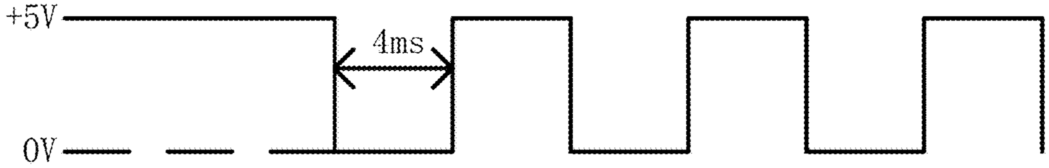
FIG. 10 is a schematic diagram of a pulse waveform signal according to an embodiment of the earphone control method of the present application.

As shown in FIG. 10, if the preset interval is 4 ms, during the process of the earphone box controlling the voltage level of the first electrical contact to be switched between the low level and the high level, pulse waveform signals each having a period of 8 ms are formed. In this case, the preset signals correspond to the falling edge signals and the rising edge signals of the pulse waveform signals.

Operation S20, upon receiving a response signal fed back by the earphone based on the preset signals, switching the first electrical contact to the communication state.

Optionally, after the earphone detects the preset signals formed by the earphone box via the first electrical contact, the number of the detected preset signals can be identified (equivalent to that the total number of the rising edge signals and the falling edge signals of the pulse waveform signals). Upon detecting that the number of the detected preset signals is greater than or equal to the first preset number of times, the earphone switches the second electrical contact from the charging state to the communication state to stop charging, switches the transceiving state of the second electrical contact in the communication state to the TX signaling state, and transmits the response signal obtained by responding based on the preset signals to the earphone box through the second electrical contact.

Optionally, in order to prevent the earphone from missing the preset signals, the number of the preset signals sent by the earphone box may be greater than the preset number of times. For example, when the preset interval is 4 ins and the preset number of times is 5, the pulse waveform signal, the whole period of which is 20 ms, is generated, but in order to prevent the earphone from missing the preset signals, the earphone box can correspondingly generate a pulse waveform signal with the whole period of 40 ins, so that the sum of the rising edges and the falling edges corresponding to the pulse waveform signal can exceed 5.

Optionally; when the earphone box receives a response signal fed back by the earphone based on the preset signals, the first electrical contact is switched from the charging state to the communication state (i.e., the voltage level of the first electrical contact is adjusted to 3.3 V), so as to establish a communication between the earphone box and the earphone.

It should be noted that when the transceiving state of the first electrical contact of the earphone box is the TX signaling state, the earphone box can be used for sending data to the earphone, and when the transceiving state of the first electrical contact of the earphone box is the RX receiving state, the earphone box can be used for receiving the data sent from the earphone. Similarly, when the transceiving state of the second electrical contact of the earphone is the TX signaling state, the earphone can be used for sending data to the earphone box; and when the transceiving state of the second electrical contact of the earphone is the RX receiving state; the earphone can be used for receiving the data sent from the earphone box Optionally, after the communication between the earphone box and the earphone is established, the situation such as that the earphone is suddenly pulled out from the earphone box or the earphone is in an abnormal state or a sleep state may occur. At this moment, if the earphone box communicates immediately; data loss; program logic abnormality and the like may be caused. In order to deal with such a situation, after the first electrical contact is switched to the communication state, the earphone box immediately initiates a handshake to the earphone (that is, sends a handshake signal), and then switches the transceiving state of the first electrical contact to the RX receiving state, and waits for the earphone to feed back a handshake signal, so as to ensure that the earphone is in the earphone box and in a normal active state.

Optionally; after the earphone box switches the state of the first electrical contact to the communication state, the handshake signal can be transmitted to the second electrical contact (i.e., the earphone) through the first electrical contact, after the earphone receives the handshake signal transmitted from the earphone box, a handshake signal is also fed back to the earphone box. In this way, after the handshake signals are interchanged between the earphone box and the earphone, communication is formally established between the earphone box and the earphone.

Optionally, after the earphone box and the earphone establish the communication based on the first electrical contact, at this time, the earphone box is in a signaling state, the earphone is in a receiving state, and then, the process of data exchange is controlled by the earphone box, and TX data of the earphone box is transmitted in time to the earphone.

Optionally, the earphone box firstly sends the data cached in the TX buffer of the earphone box to the earphone, and sends an inquiry instruction to the earphone, so as to inquire whether there are data cached by the earphone to be sent to the earphone box. After the sending is finished, the earphone box is immediately switched to the receiving state. After receiving the inquiry instruction, the earphone switches from the RX receiving state to the TX signaling state. At this time, if there are data to be sent, the earphone can start to transmit the data after receiving the inquiry instruction until the TX buffer is emptied, and then the earphone sends an empty packet ack (namely a null data packet), that is, if the earphone does not have data to be transmitted, the earphone directly returns a null data packet, and after the data transmission is completed, the earphone actively switches from the TX signaling state to the RX receiving state, so as to indicate that the data to be transmitted has been sent. After the earphone box receives the empty ack sent from the earphone, the earphone box is switched from the RX receiving state to the TX signaling state immediately. In this way, one time of data exchange between the earphone box and the earphone is completed, and the next exchanging process is immediately initiated by the earphone box, till that there is no data exchange in multiple exchange processes. The two are returned back to the charging state again.

In one embodiment, when the first electrical contact is in the charging state, and the earphone box detects that there is a communication requirement between the earphone box and the earphone, the voltage level of the first electrical contact is adjusted to send preset signals to the earphone through the first electrical contact. When a response signal fed back by the earphone based on the preset signals is received, the first electrical contact is switched to the communication state. In this way, charging of the earphone box to the earphone and communication between the earphone box and the earphone can be realized based on the electrical contact, no additional communication contact is needed, the contacts between the TWS earphone and the earphone charging box is reduced, and the stability of the TWS earphone is improved.

Figure 6:
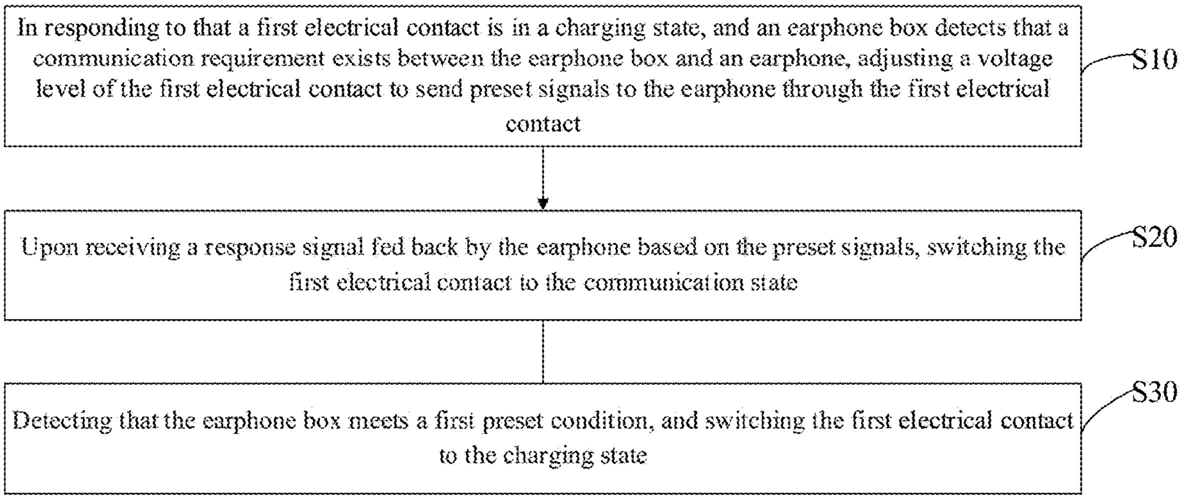
FIG. 6 is a schematic flowchart of the earphone control method according to a second embodiment of the present application.

In a second embodiment, with reference to FIG. 6, based on the embodiment shown in FIG. 5, after the operation of in responding to receiving the response signal fed back by the earphone based on the preset signals, switching the first electrical contact to the communication state, the method further includes:

operation S30, detecting that the earphone box meets a first preset condition, and switching the first electrical contact to the charging state.

In this embodiment, the executive terminal is the earphone box.

Optionally, the first preset condition includes at least one of the following: the earphone box having no data to be sent to the earphone; no data being received from the earphone in a preset duration; a number of times of receiving an empty data packet from the earphone being greater than or equal to a second preset number of times; and detecting that the earphone is not fully charged.

The earphone box has no data to be sent to the earphone, that is, the data cached in the TX buffer of the earphone box have been sent.

The preset duration can be set by an engineer in advance according to the actual condition, which is not limited in this embodiment.

The number of times of receiving an empty data packet sent from the earphone is the counted number of times of the earphone continuously sending an empty data packet to the earphone box. The second preset number of times may be set by the engineer in advance according to the actual condition, which is optionally 5.

The earphone box can carry out power level detection on the earphone electrically connected with the earphone box in real time or regularly.

Optionally, when the earphone box detects that the first preset condition is met, the earphone box can determine that there is no communication requirement with the earphone, at this time, the earphone box switches the first electrical contact from the communication state to the charging state, so as to re-charge the earphone electrically connected with the earphone box.

Optionally, the first preset condition being met requires that two conditions, namely the earphone box having no data to be sent to the earphone and the number of times of receiving an empty data packet from the earphone being greater than or equal to the second preset number of times, are both met.

In one embodiment, when it is detected that the earphone box meets the first preset condition, the first electrical contact is switched to the charging state. In this way, by controlling the automatic switching of the first electrical contact between the communication state and the charging state, the effect of realizing communication and charging of the earphone based on the first electrical contact is optimized.

Figure 7:
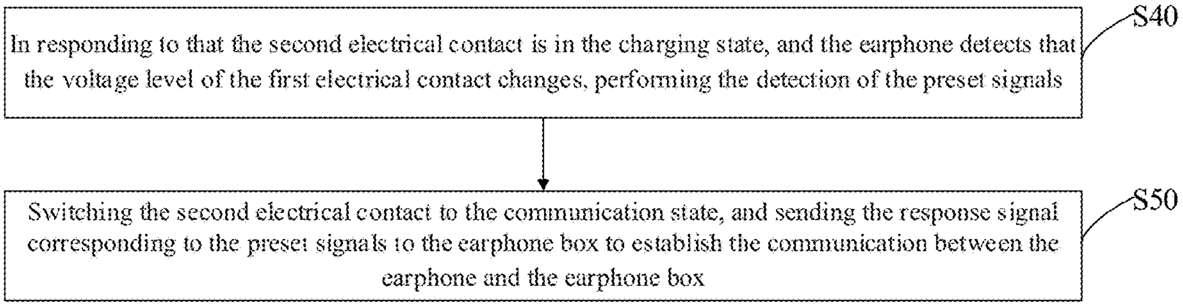
FIG. 7 is a schematic flowchart of the earphone control method according to a third embodiment of the present application.

In a third embodiment, as shown in FIG. 7, based on the embodiments of FIGS. 5 and 6, the earphone control method further includes the following operations:

- operation S40, in responding to that the second electrical contact is in the charging state, and the earphone detects that the voltage level of the first electrical contact changes, performing detection of the preset signals.
- operation S50, switching the second electrical contact to the communication state, and sending the response signal corresponding to the preset signals to the earphone box to establish the communication between the earphone and the earphone box.

In this embodiment, the executive terminal is the earphone.

Optionally, when the second electrical contact of the earphone is in the charging state, the second electrical contact is used for charging the earphone after being electrically connected with the first electrical contact of the earphone box. When the second electrical contact of the earphone is in the communication state, the second electrical contact is used for establishing the communication between the earphone and the earphone box after being electrically connected with the first electrical contact of the earphone box.

Optionally, when the second electrical contact is in the charging state, the earphone can be charged through the first electrical contact of the earphone box which is also in the charging state. At this time, when the earphone box detects that a communication requirement exists currently, the earphone box can firstly send the preset signals to the earphone through the first electrical contact to notify the earphone that, at current the earphone box needs to establish a communication with the earphone and needs to suspend the charging.

Optionally, the earphone box may alternately switch the voltage level of the first electrical contact between a low level (e.g., 0V) and a high level (e.g., 5V) for a first preset number of times, so as to send the preset signals to the earphone. Each time a switching operation of switching between the high level and the low level is performed, it is equivalent to generating one preset signal.

Further, in the process of switching the voltage level of the first electrical contact between the low level and the high level, the earphone box controls the time interval between two adjacent switching operations to be a preset interval.

It should be noted that the preset number of times and the preset interval may be set by an engineer in advance according to the actual condition, for example, the first preset number of times may optionally be 5, and the preset interval may optionally be 4 ms.

As shown in FIG. 10, if the preset interval is 4 ms, during the process of the earphone box controlling the voltage level of the first electrical contact to be switched between the low level and the high level, pulse waveform signals each having a period of 8 ms are formed. In this case, the preset signals correspond to the falling edge signals and the rising edge signals of the pulse waveform signals.

Optionally, the second processor (MCU) of the earphone is provided with a PMU detection unit, which is configured for detecting the high and low levels of the first electrical contact electrically connected with the second electrical contact, that is, the switching between the high and low levels of the first electrical contact can be detected.

Optionally, when the second electrical contact is in the charging state, and the earphone detects that the voltage level of the first electrical contact changes, detecting the preset signals is performed. It should be noted that, when the earphone box effectively charges the earphone through the first electrical contact, the voltage level of the first electrical contact is the high level (5V). When the earphone detects that the first electrical contact jumps from the high level to the low level, detecting the preset signals is performed. Of cause, after the earphone detects that the first electrical contact jumps from the low level to the high level, the earphone can also determine that one preset signal is detected, so that the preset signals are detected by detecting the repeated jumping of the voltage level of the first electrical contact.

Optionally, after the earphone detects the preset signals formed by the earphone box based on the first electrical contact, the number of times of the detected preset signal can be identified (equivalent to that the total number of the rising edge signals and the falling edge signals of the pulse waveform signal is identified) as the preset signals, and whether the preset signals meet a second preset condition is judged based on the number of times of detection, the second preset condition includes the number of times of detection of the preset signals being greater than or equal to a first preset number of times.

Optionally, when the earphone detects that the number of times of detection of the preset signals is greater than or equal to the first preset number of times, the earphone determines that the preset signals meet the second preset condition, at this time, the earphone switches the second electrical contact from the charging state to the communication state to stop charging, switches the transceiving state of the second electrical contact in the communication state to the TX signaling state, and transmits the response signal obtained based on responding to the preset signals to the earphone box through the second electrical contact.

That is, when the earphone determines that the preset signals meet the second preset condition, executing the operation of switching the second electrical contact to the communication state, and sending the response signal corresponding to the preset signals to the earphone box, to establish the communication between the earphone and the earphone box (operation S50).

Optionally, when the earphone detects that the number of times of detection corresponding to the preset signals is less than the first preset number of times, the earphone determines that the preset signals do not meet the second preset condition. At this time, the earphone still controls the second electrical contact to maintain the charging state.

For example, when the preset number of times is 5, when the earphone detects that the number of times of detection of the preset signals is 6, the preset signals are judged to meet the second preset condition; and when the number of times of detection of the preset signal performed by the earphone is 3, the preset signals are judged not to meet the second preset condition.

Optionally, each time a preset signal is detected by the earphone, the number of times of detection is incremented by one.

In one embodiment, when the second electrical contact is in the charging state, and the earphone detects that the voltage level of the first electrical contact changes, detection of the preset signals is performed, the second electrical contact is switched to the communication state, and the response signal corresponding to the preset signals is sent to the earphone box to establish communication between the earphone and the earphone box. In this way, charging of the earphone box to the earphone and communication between the earphone box to the earphone can be realized based on the electrical contact without additionally adding a communication contact, and the stability of the TWS earphone is improved by reducing the number of contacts between the TWS earphone and the earphone charging box.

Figure 8:
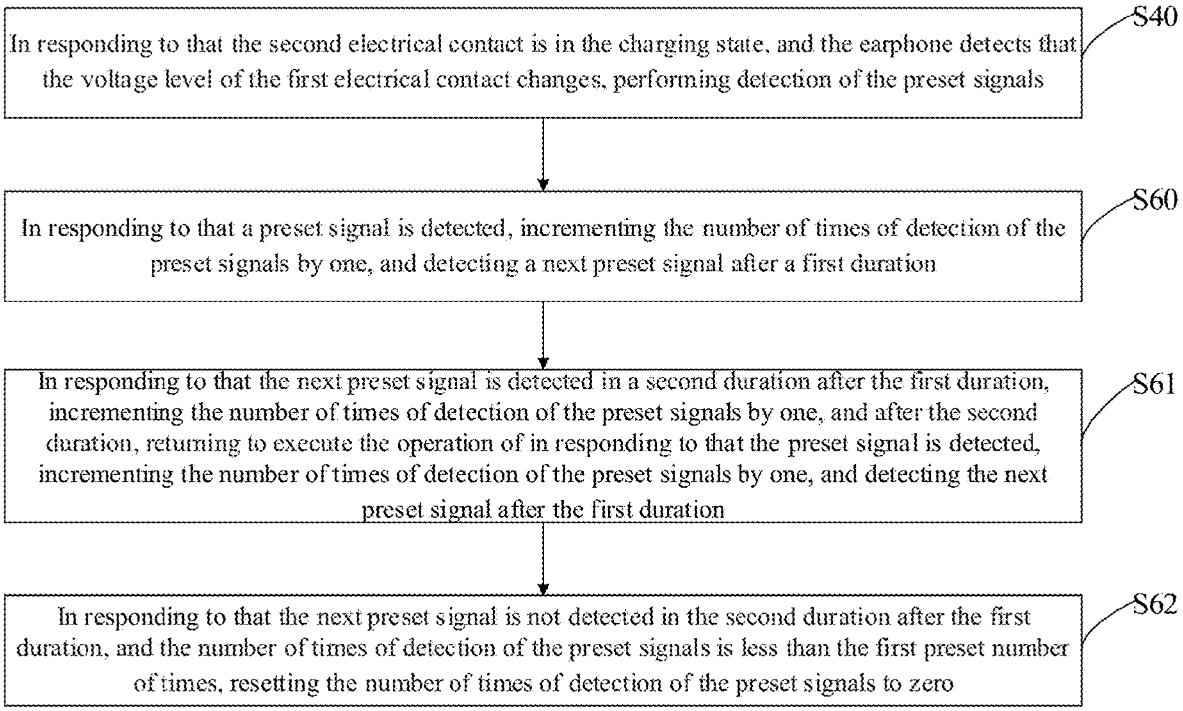
FIG. 8 is a schematic flowchart of the earphone control method according to a fourth embodiment of the present application.

In a fourth embodiment, as shown in FIG. 8, based on the embodiments of FIGS. 5 to 7, the earphone control method further includes:

- operation S60, in responding to that a preset signal is detected, incrementing the number of times of detection of the preset signals by one, and detecting a next preset signal after a first duration;
- operation S61, in responding to that the next preset signal is detected in a second duration after the first duration, incrementing the number of times of detection of the preset signals by one, and after the second duration, returning to execute the operation of in responding to that the preset signal is detected, incrementing the number of times of detection of the preset signals by one, and detecting the next preset signal after the first duration;
- operation S62, in responding to that the next preset signal is not detected in the second duration after the first duration, and the number of times of detection of the preset signals is less than the first preset number of times, resetting the number of times of detection of the preset signals to zero.

In this embodiment, the executive terminal is the earphone.

Optionally, in the first duration timed from a preset signal is currently detected, detection of the preset signals is no longer performed. Even if a preset signal is detected within the first duration, the number of times of detection of the preset signals is not incremented. Then, after the first duration, and the detection of the preset signals is performed again within the second duration after the first duration, that is, if the earphone detects a next preset signal in the second duration, the number of times of detection is incremented by one. Then, after the second duration, the earphone returns to execute the operation of in responding to that the preset signal is detected, incrementing the number of times of detection of the preset signals by one, and detecting the next preset signal after the first duration (i.e., operation 60), and the first duration and the second duration are re-timed.

It should be understood that an end time point of the first duration is a start time point of the second duration. It should be noted that the first duration is less than the preset interval, and the sum of the first duration and the second duration is greater than the preset interval but less than twice the preset interval. For example, when the preset interval is 4 ms, the first duration may be 3 ms, and the second duration may be 2 ms.

Optionally, if the earphone does not detect a next preset signal in the second duration after the first duration, and the number of times of detection of the preset signals is less than the first preset number of times, the earphone resets the number of times of detection of the preset signals to be zero, and controls the second electrical contact to still in the charging state.

Optionally, if the earphone does not detect a next preset signal in the second duration after the first duration, and the number of times of detection of the preset signals is greater than or equal to the first preset number of times, the earphone switches the second electrical contact from the charging state to the communication state.

It should be noted that, whenever the earphone switches the second electrical contact from the charging state to the communication state, the number of times of detection is reset to zero.

Further, the earphone is further provided with a third duration, and the third duration can optionally be five times the preset interval. For example, when the preset interval is 4 ms, the third duration may be 20 ms.

Optionally, when a first preset signal is detected, the earphone starts to time the third duration, after the third duration ends, if the number of times of detection of the preset signals is less than the first preset number of times, the earphone resets the number of times of detection to be zero, and controls the second electrical contact to still in the charging state.

Optionally, effective detection of the preset signals can be achieved by providing the first duration, the second duration, and/or the third duration. That is, only a preset signal detected within a specified duration is counted as an effective signal, and the number of times of detection is incremented. Otherwise, the number of times of detection is not incremented, or the number of times of detection is reset to zero.

In this way, the situation that a user suddenly takes up the earphone, the pulse waveform signal is interrupted, and the next preset signal trigger will be influenced if there is no abnormal processing mechanism of effectively detecting the preset signals, can be avoided. Or, the situation that due to that the earphone is suddenly placed in the box, the sudden contact can cause mechanical vibration, jag interference on the communication line of the earphone box is caused, and a preset signal is generated passively can be avoided.

In this way, the earphone can be prevented from detecting an invalid preset signal and counting the invalid preset signal (the invalid preset signal is not actively initiated by the earphone box, but is generated due to external environmental factors).

Figure 9:
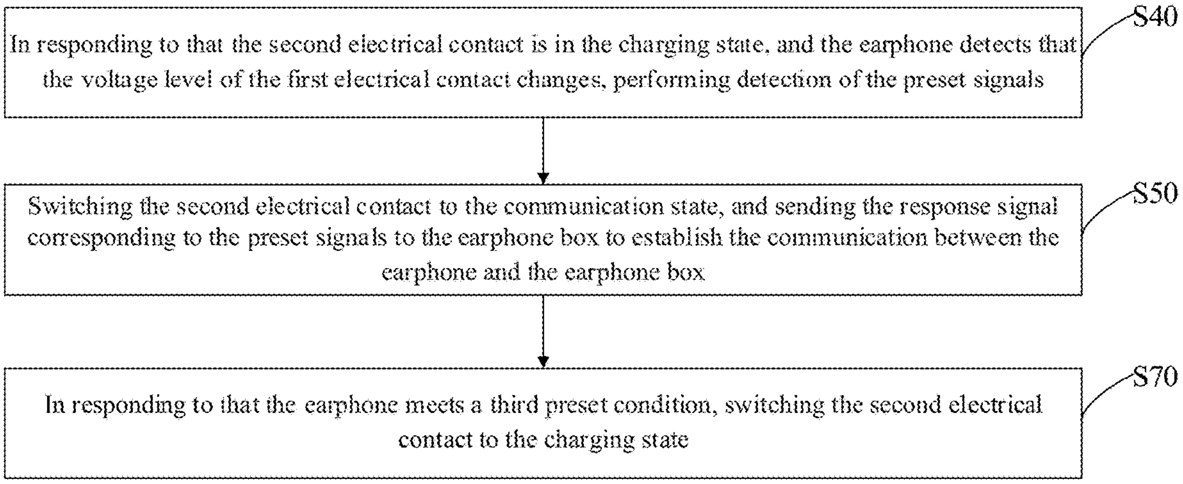
FIG. 9 is a schematic flowchart of the earphone control method according to a fifth embodiment of the present application.

In a fifth embodiment, as shown in FIG. 9, based on the embodiments of FIG. 5 to FIG. 8, after the operation of switching the second electrical contact to the communication state, and sending the response signal corresponding to the preset signals to the earphone box to establish the communication between the earphone and the earphone box, the method further includes:

operation S70, in responding to that the earphone meets a third preset condition, switching the second electrical contact to the charging state.

In this embodiment, the executive terminal is the earphone.

Optionally, the third preset condition includes at least one of the following: the earphone having no data to be sent to the earphone box; no data being received from the earphone box in a preset duration; and a number of times of receiving an empty data packet from the earphone box being greater than or equal to a second preset number of times.

The earphone has no data to be sent to the earphone box, that is, the data cached in the TX buffer of the earphone have been sent.

The preset duration can be set by an engineer in advance according to the actual condition, which is not limited in this embodiment.

The number of times of receiving an empty data packet sent from the earphone box is the counted number of times of the earphone box continuously sending an empty data packet to the earphone. The second preset number of times may be set by the engineer in advance according to the actual condition, which is optionally 5.

Optionally, when the earphone detects that the third preset condition is met, the earphone can determine that there is no communication requirement with the earphone box, at this time, the earphone switches the second electrical contact from the communication state to the charging state, so as to re-charge based on the first electrical contact electrically connected with the second electrical contact.

Optionally, the third preset condition being met requires that two conditions, namely the earphone having no data to be sent to the earphone box and the number of times of the earphone receiving an empty data packet from the earphone box being greater than or equal to the second preset number of times, are both met.

In one embodiment, when it is detected that the earphone meets the third preset condition, the second electrical contact is switched to the charging state. In this way, by controlling the automatic switching of the second electrical contact between the communication state and the charging state, the effect of realizing communication and charging of the earphone based on one electrical contact is optimized.

In addition, the present application further provides an earphone box. The earphone box includes a memory, a processor and an earphone control program stored in the memory and executable by the processor. When the processor executes the earphone control program, the operations of the earphone control method according to the above embodiments are realized.

In addition, the present application further provides an earphone. The earphone includes a memory, a processor and an earphone control program stored in the memory and executable by the processor. When the processor executes the earphone control program, the operations of the earphone control method according to the above embodiments are realized.

In addition, the present application further provides a computer readable storage medium, the computer readable storage medium includes an earphone control program, when the earphone control program is executed by the processor, the operations of the earphone control method according to the above embodiments are realized.

The serial numbers of the above embodiments of the present application are only for description only, and do not represent the superiority and inferiority of the embodiments.

From the above description of the embodiments, it will be clear to those skilled in the art that the method of the above embodiments can be implemented by means of software plus the necessary common hardware platform, and of course can also by means of hardware, but in many cases the former is preferred. Based on this understanding, the technical solution of the present application can be embodied in the form of software products in essence or the part that contributes to the prior art. The computer software product is stored in a storage medium (e.g. ROM/RAM, magnetic disk, optical disk) and includes instructions for causing a terminal (which may be a television, a mobile phone, a computer, a server, an air conditioner, or a network device, etc.) to perform the methods described in various embodiments of the present application.

The above are option embodiments of the present application, and is not intended to limit the claimed scope of the present application. Any equivalent structure or equivalent process transformation made using the description and drawings of the present application, or any direct or indirect application to other related technical fields, is included in the claimed scope of the present application.

What is claimed is:

1. An earphone control method applied to an earphone box, wherein the earphone box is provided with a first electrical contact, when the first electrical contact is in a charging state, the first electrical contact is configured for charging the earphone, and when the first electrical contact is a communication state, the first electrical contact is configured for establishing communication between the earphone box and the earphone, the earphone control method comprises:

in responding to that the first electrical contact is in the charging state, and the earphone box detects that a communication requirement exists between the earphone box and the earphone, adjusting a voltage level of the first electrical contact to send preset signals to the earphone through the first electrical contact;

upon receiving a response signal fed back by the earphone based on the preset signals, switching the first electrical contact to the communication state; and controlling the voltage level of the first electrical contact to alternately switch between a low level and a high level for a first preset number of times.

2. The earphone control method according to claim 1, wherein after the operation of upon receiving the response signal fed back by the earphone based on the preset signals, switching the first electrical contact to the communication state, the method further comprises:

detecting that the earphone box meets a first preset condition, and switching the first electrical contact to the charging state, wherein the first preset condition comprises at least one of the followings:

the earphone box having no data to be sent to the earphone;

no data being received from the earphone in a preset duration;

a number of times of receiving an empty data pa from the earphone being greater than or equal to a second preset number of times; and detecting that the earphone is not fully charged.

3. An earphone box, comprising a memory, a processor, and an earphone control program stored in the memory and executable by the processor, wherein when the earphone control program is executed by the processor, the operations of the earphone control method according to claim 1 are implemented.

4. The earphone box according to claim 3, wherein the operation of adjusting the voltage level of the first electrical contact comprises:

controlling the voltage level of the first electrical contact to alternately switch between a low level and a high level for a first preset number of times.

5. The earphone box according to claim 3, wherein when the earphone control program is executed by the processor, after the operation of upon receiving the response signal fed back by the earphone based on the preset signals, switching the first electrical contact to the communication state, following operations are further implemented:

detecting that the earphone box meets a first preset condition, and switching the first electrical contact to the charging state, wherein the first preset condition comprises at least one of the followings:

the earphone box having no data to be sent to the earphone;

no data being received from the earphone in a preset duration;

a number of times of receiving an empty data packet from the earphone being greater than or equal to a second preset number of times; and detecting that the earphone is not fully charged.

6. A non-transitory computer readable storage medium, wherein an earphone control program is stored in the computer readable storage medium, when the earphone control program is executed by a processor, the operations of the earphone control method according to claim 1 are implemented.

7. The non-transitory computer readable storage medium according to claim 6, wherein the operation of adjusting the voltage level of the first electrical contact comprises:

controlling the voltage level of the first electrical contact to alternately switch between a low level and a high level for a first preset number of times.

8. The non-transitory computer readable storage medium according to claim 6, wherein when the earphone control program is executed by the processor, after the operation of upon receiving the response signal fed back by the earphone based on the preset signals, switching the first electrical contact to the communication state, following operations are further implemented:

detecting that the earphone box meets a first preset condition, and switching the first electrical contact to the charging state, wherein the first preset condition comprises at least one of the followings:

the earphone box having no data to be sent to the earphone;

no data being received from the earphone in a preset duration;

a number of times of receiving an empty data packet from the earphone being greater than or equal to a second preset number of times; and detecting that the earphone is not fully charged.

* * * * *